(12) United States Patent
Schmidt

(10) Patent No.: US 6,675,378 B1
(45) Date of Patent: Jan. 6, 2004

(54) OBJECT ORIENTED APPARATUS AND METHOD FOR ALLOCATING ARRAY OBJECTS ON AN INVOCATION STACK

(75) Inventor: William Jon Schmidt, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/478,378

(22) Filed: Jan. 6, 2000

(51) Int. Cl.$^7$ .............................. G06F 9/45; G06F 9/44
(52) U.S. Cl. ...................... 717/154; 717/108; 717/116; 717/118; 717/165; 717/151
(58) Field of Search ......................... 717/154, 151–153, 717/155–161, 108, 114, 116, 118, 146–150, 165–166; 709/331–332; 714/35, 37, 38

(56) References Cited

U.S. PATENT DOCUMENTS 5,590,332 A * 12/1996 Baker .......................... 717/151
6,353,829 B1 * 3/2002 Koblenz et al. ............ 707/100
6,442,751 B1 * 8/2002 Cocchi et al. ............... 717/133

OTHER PUBLICATIONS

Kleinnoder–Golm, MetaJava: An Efficient Run–time Meta Architecture for java, Oct. 18, 1996, Proceedings of the International Workshop on Object Orientation in Operating Systems—IWOOOS 96.*

Choi et al., "Escape Analysis for Java", In Proceedings of the Conference on Object Oriented Programming, Systems, and Languages (OOPSLA), Denver, CO (Nov. 1999), p. 1–19.

Gay and Steensgaard, "Stack Allocating Objects in Java", p. 1–10., Undated.

* cited by examiner

Primary Examiner—Hoang-Vu Anthony Nguyen-Ba
(74) Attorney, Agent, or Firm—Martin & Associates, L.L.C.

(57) ABSTRACT

An object oriented mechanism and method allow allocating Java array objects of unknown size at compile time to a method's invocation stack if the array's size is less than a predetermined threshold value. If the array object could typically be allocated to the invocation stack if it were of a known size at compile time, run-time code is generated that examines the actual size of the array object at run-time and that allocates the array object to the invocation stack if the size is less than a predetermined threshold value. In this manner Java array objects that have an unknown size at compile time may still be allocated to an invocation stack at run-time if the size of the object is sufficiently small.

21 Claims, 10 Drawing Sheets

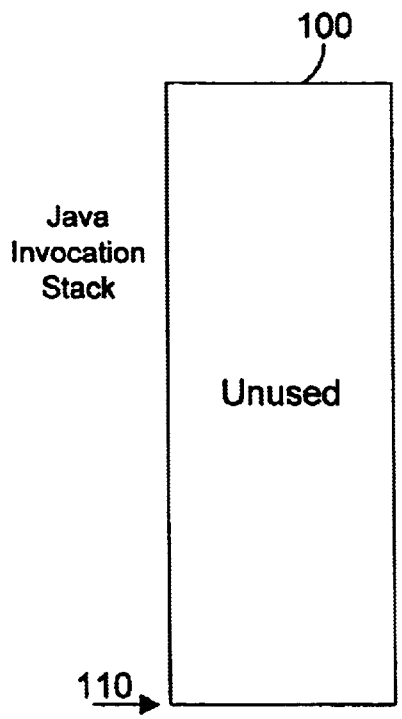
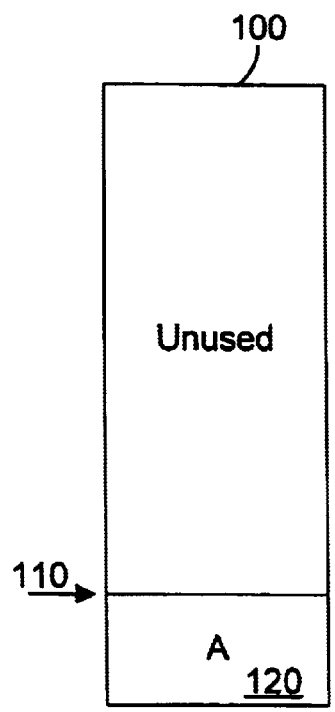
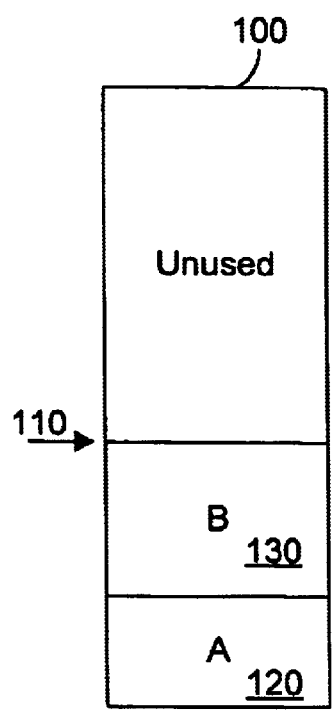
FIG. 1A   FIG. 1B   FIG. 1C
Prior Art
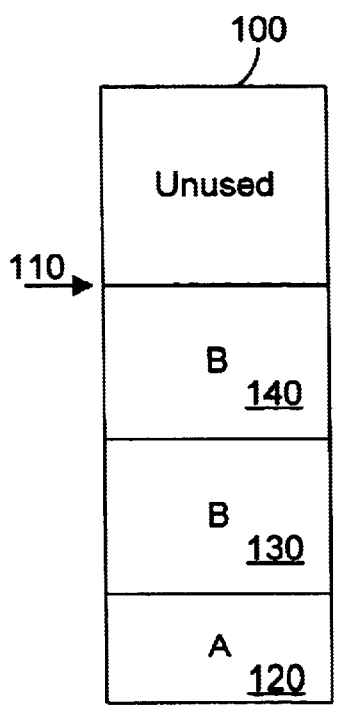
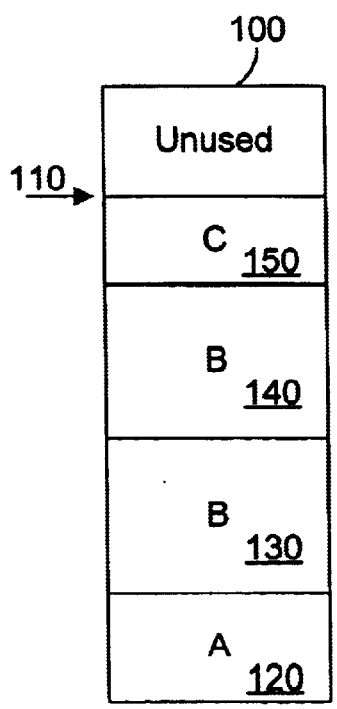
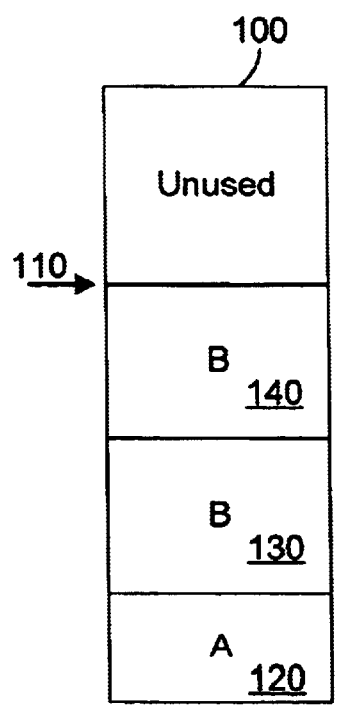
FIG. 1D   FIG. 1E   FIG. 1F

```
C++
A() {
    Square k;
    ⋮
}
```
FIG. 2A
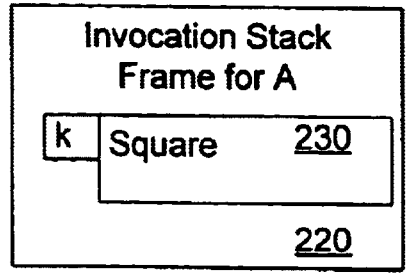
FIG. 2B
```
Java
A() {
    ⋮
    Square k = new Square();
    ⋮
}
```
Prior Art
FIG. 3A
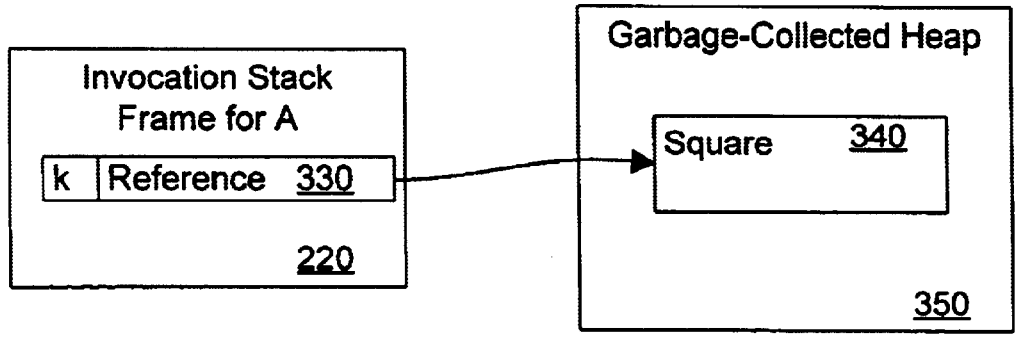
FIG. 3B          FIG. 3C
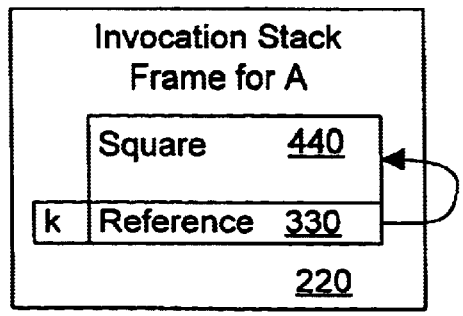
FIG. 4

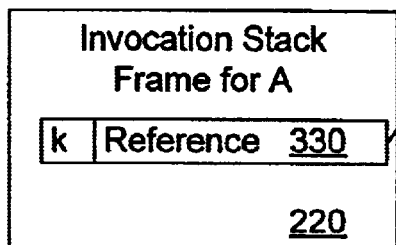
FIG. 5A
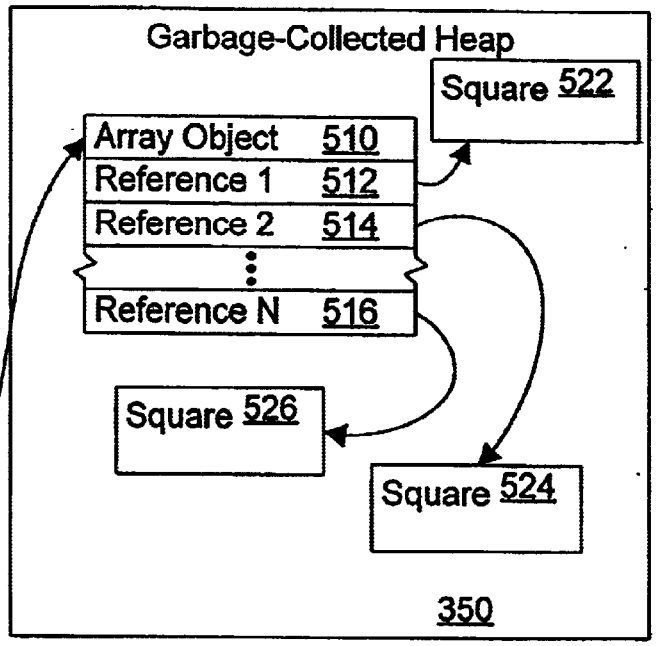
FIG. 5C  Prior Art
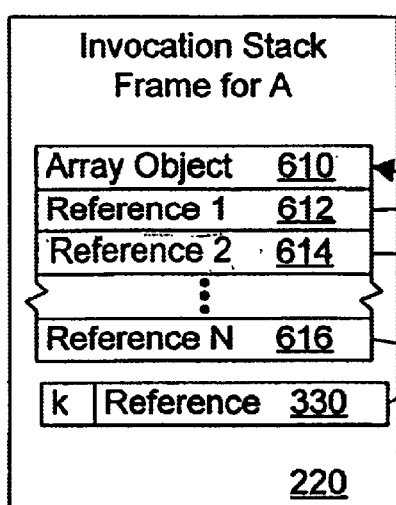
Prior Art
FIG. 5B
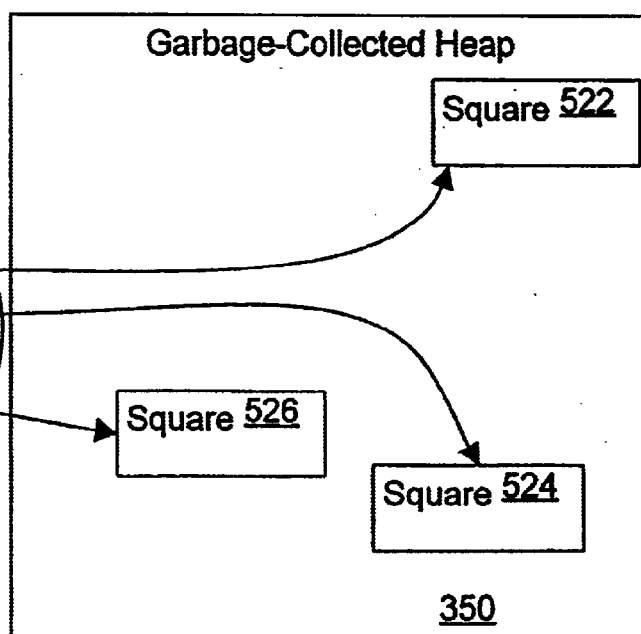
FIG. 6A
FIG. 6B

```
A() {          NO ESCAPE
  •
  •
  •
  Square k = new Square();
  •
  •
}
```
FIG. 7A

```
static Square classVar;
A() {          GLOBAL ESCAPE
  •
  •
  •
  Square k = new Square();
  classVar = k;
  •
  •
}
```
FIG. 7B

Prior Art

```
Square A() {   ARG ESCAPE
  •
  •
  •
  Square k = new Square();
  return k;
  •
  •
}
```
FIG. 7C

```
A(List L) {    ARG ESCAPE
  •
  •
  •
  Square k = new Square();
  L.addToList(k);
  •
  •
}
```
FIG. 7D

OBJECT ORIENTED APPARATUS AND METHOD FOR ALLOCATING ARRAY OBJECTS ON AN INVOCATION STACK

BACKGROUND OF THE INVENTION

1. Technical Field

This invention generally relates to the data processing field. More specifically, this invention relates to the location of object creation in object oriented systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modern object oriented programming language that has become very popular in recent years. From a programmer's point of view, one of the advantages of the Java programming language is that memory allocation and reclamation are handled entirely by the run-time system, which relieves the programmer of the burden of determining how and when to destroy unneeded objects. All objects (other than those of primitive types) are allocated from a common "heap", or section of memory. The garbage collection mechanism then monitors the objects in the heap, and periodically deletes unneeded objects, thereby reclaiming portions of the heap that are occupied by objects that can no longer be accessed from the user's program.

One problem with the Java automatic allocation and reclamation of memory is that users have less control over their program's performance. Each time an object is allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spend in the memory manager, allocating and reclaiming memory for objects.

Java's memory management overhead is far greater than that of the C++ programming language, primarily because every Java object is allocated from the heap. In C++, programmers are given more control over the allocation of their objects. In particular, C++ programmers are able to declare objects to be local to a method. These objects come into existence when the method is invoked, and are automatically reclaimed when the method invocation terminates. Further, the run-time cost of allocating these objects is essentially zero, since they simply occupy space in the method's invocation stack frame. Adding an object to the invocation stack frame simply means that the amount by which the stack pointer is moved must increase, but no additional instructions are required to do this. Compare this with Java, where every created object, no matter how small or how temporary, requires overhead from the run-time memory manager.

Recently, researchers in compiler technology have been working on ways to allocate some Java objects on a method's stack frame, rather than going to the heap for each and every object, thereby improving on the performance of the native Java capabilities. In particular, if a compiler can automatically detect Java objects whose "lifetimes" do not extend beyond the method in which they are created, these objects can be automatically allocated on the stack by the compiler rather than from the garbage-collected heap, resulting in improved performance. The technology used to determine which objects may be allocated on the stack is called "escape analysis". The idea is to determine which objects have lifetimes that do not "escape" from the methods that create them. Escape analysis is presented in a paper by Choi et al., "Escape Analysis for Java", In Proceedings of the Conference on Object Oriented Programming, Systems, and Languages (OOPSLA), Denver, Colo. (November 1999), p. 1–19.

Escape analysis as described by Choi et al. generally allows allocating objects to a method's stack if their lifetimes do not escape from their creating method. However, some types of objects, such as Java array objects, may have a size that is unknown at compile time, and therefore cannot be allocated to a method's stack even if their lifetimes do not escape from their creating method. When an array object has an unknown size at compile time, the prior art allocates the array object from the heap. When an array object turns out to be small at run-time, the overhead associated with allocating the array object from the heap is a cost that must be incurred because there is no way in the prior art to stack-allocate array objects of unknown size at compile time. Without an apparatus and methods for allocating array objects of unknown size at compile time to a method's call stack at run-time if the size of the array object is not excessive, the computer industry will continue to suffer undue performance limitations caused by allocating all Java array objects of unknown size at compile time from the heap.

DISCLOSURE OF INVENTION

According to the preferred embodiments, an object oriented mechanism and method allow allocating Java array objects of unknown size at compile time to a method's invocation stack if the array's size is less than a predetermined threshold value. Run-time code is generated that examines the actual size of the array object at run-time and that allocates the array object to the invocation stack at run-time if the size is less than a predetermined threshold value. In this manner Java array objects that have an unknown size at compile time may still be allocated to an invocation stack at run-time if the size of the object is sufficiently small.

BRIEF DESCRIPTION OF DRAWINGS

The preferred exemplary embodiments of the present invention will hereinafter be described in conjunction with the appended drawings, where like designations denote like elements, and:

FIGS. 1A–1F are each block diagram representations of a prior art invocation stack in various states;

FIG. 2A is a diagram of C++ pseudo-code;

FIG. 2B is a block diagram showing the object allocation for the C++ code of FIG. 2A;

FIG. 3A is a diagram of Java pseudo-code;

FIGS. 3B and 3C are block diagrams that show the object allocation for the Java code of FIG. 3A;

FIG. 4 is a block diagram showing the allocation of a Java object on an invocation stack frame;

FIG. 5A is a diagram of Java pseudo-code that defines an array object;

FIGS. 5B and 5C are block diagrams showing the object allocation of the prior art for the Java code of FIG. 5A;

FIGS. 6A and 6B are block diagrams showing the object allocation in accordance with the preferred embodiments for the Java code of FIG. 5A, where the array object is allocated to an invocation stack frame;

FIGS. 7A–7D are diagrams that show Java pseudo-code examples for no escape, global escape, and arg escape;

BEST MODE FOR CARRYING OUT THE INVENTION

Figure 8:
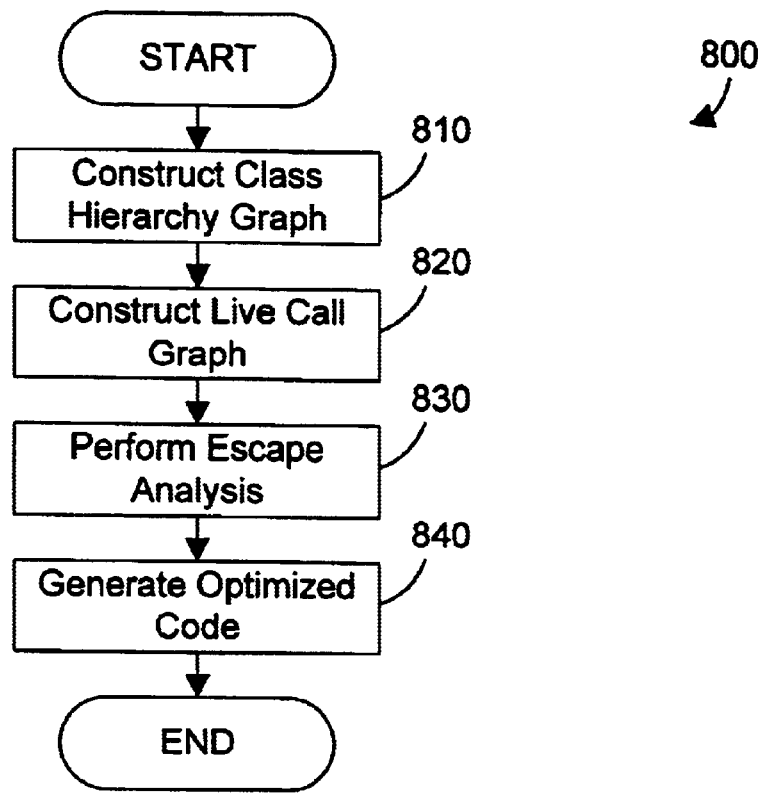
FIG. 8 is a prior art method for allocating objects in a Java program.

The present invention relates to object oriented programming techniques. For those individuals who are not generally familiar with object oriented programming, the Overview section below presents many of the concepts that will help to understand the invention.

1. Overview

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object", in another location, which may be a remote location. The client object server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Java Programming Language

Java is a modem object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

Invocation Stacks in Java

The Java programming language defines one or more invocation stacks that are used to store information when a method is called (or invoked). FIG. 1 shows various views of an invocation stack 100 in different states. Referring to FIG. 1A, invocation stack 100 is shown before any methods are invoked, with its stack pointer 110 at the bottom of the stack. Entries are stored on the stack bottom up. Note that the stack pointer could equally be at the top of the stack, with the entries stored on the stack top down. FIG. 1B illustrates what happens when method A is invoked. An invocation stack frame 120 for A is pushed on the stack, and the stack pointer 110 is then moved to the next available location on the stack.

An invocation stack frame can contain many different types of data. For example, an invocation stack frame can contain the stored state of all processor registers when the method was invoked, so that some or all of these values can be restored when the method has completed. An invocation stack frame can also contain storage for any variables that are local to the method. Thus, if an integer m is declared as a local variable, the invocation stack frame would contain the memory allocation for m. The prior art recognized that object invocations whose lifetimes do not escape the invoking method may also be stored on the stack frame as well.

Referring to FIG. 1C, we assume that in the execution of method A, method B is invoked, so the stack frame 130 for method B is pushed on the invocation stack 100, and the stack pointer 110 is moved to the next available location. We assume that method B calls itself, which causes another instance 140 of a stack frame for method B to be stored on the invocation stack 100, with the stack pointer 110 moved to the next available location, as shown in FIG. 1D. We assume that the second invocation of method B then calls method C, so the stack frame 150 for method C is then pushed onto the invocation stack and stack pointer 110 is moved to the next available location. At this point we assume that method C does not call any other methods, and runs to completion. This causes the stack pointer 100 to move down to the beginning of the stack frame for method C, effectively reclaiming the area of the invocation stack 100 that was used for stack frame C 150. The example illustrated in FIGS. 1A–1F (and especially in FIG. 1F) makes it clear that allocating an object on a stack frame does not create any additional overhead. It may require that stack pointer 110 move a little farther to make room for the object, but this does not create any run-time performance penalty. Because of this, the more objects we can allocate to the invocation stack, the better the performance of the resulting code will be.

A difference between C++ and Java is illustrated in FIGS. 2 and 3. Referring to FIG. 2A, we assume that a "square" is a name of a particular type of object. A programmer in C++ can declare a variable as being of a "type" that is an object. As shown in FIG. 2A, the statement "Square k" is a declaration of a variable "k" that is of the type "Square", which is an object. When a variable is defined as an object, as in FIG. 2A, the object can be allocated directly on the invocation stack frame for the method, as shown in FIG. 2B. The square object 230 that corresponds to k is stored on the invocation stack frame 220 for A.

In Java, variables do not denote objects, but instead denote references (i.e., pointers) to objects. Referring to FIG. 3A, the declaration Square k=new Square( ) is a statement that says that variable k is a reference to a new object of type Square. Because k is a reference (or pointer) to the Square object, and not the object itself, the reference 330 may be stored on the stack frame 220 for the method, as shown in FIG. 3B, but the reference 330 points to a Square object 340 from the heap 350, as shown in FIG. 3C. If the object itself could be allocated to the stack frame, as shown in FIG. 4, the performance of the computer program would be improved.

FIG. 5A shows Java pseudo-code that includes an array object k that is defined as an array of Square objects. FIG. 5B and 5C show a typical heap allocation of a Java array object k. A reference 330 on invocation stack frame 220 represents k, and points to a corresponding array object 510 that is allocated from the heap 350. Array object 510 includes references (e.g., 512, 514 and 516) that each point to objects in the heap 350. For the example of FIG. 5C, reference 512 points to object 522, reference 514 points to object 524, and reference 516 points to object 526. FIGS. 5B and 5C show the typical Java allocation of k, with a reference on the invocation stack frame and the array object and the objects that it references located from the heap.

FIGS. 6A and 6B show the allocation of an array object on the invocation stack frame 220. Array object 610 with its associated references (e.g., 612, 614 and 616) are allocated on the stack, but these references still reference objects in the heap 350. By allocating an array object on the stack, performance of the computer program is enhanced. However, the allocation of an array object to the stack must be done carefully since it increases the size of a stack frame. If the method that creates the array object can be called recursively, the object is allocated from the heap instead of the stack in order to avoid exhausting the memory allocated to the stack. Furthermore, if the size of the array object at compile time is known and is too large, the array object is allocated from the heap as well. Finally, if the size of the array object at compile time is unknown, the array object is allocated from the heap because the prior art has no way to assure that the stack will not overflow when the size of the array object is unknown at compile time.

In addition to arrays of objects, discussed above with reference to FIGS. 5 and 6, Java also defines arrays of primitive types, such as integers, floating point numbers, etc. One skilled in the art will appreciate that the foregoing discussion of FIGS. 5 and 6 could apply equally to an array of primitive types by replacing the references in array objects 510 and 610 with values for the appropriate primitive type. In this case there would be no additional referenced objects such as those depicted as 522, 524, and 526 in FIGS. 5B and 6B.

Prior Art Escape Analysis

The "escape analysis" performed by Choi et al. in "Escape Analysis for Java", In Proceedings of the Conference on Object Oriented Programming, Systems, and Languages (OOPSLA), Denver, Colo. (November 1999), p. 1–19, determines whether the lifetime of an object "escapes" the method that creates the object. If not, the object itself 440 can be allocated on the stack, as shown in FIG. 4. Even though k is still a reference 330, the object 440 that it references can also be stored on the invocation stack frame 220 for the method that creates the object 440. As described above with reference to FIG. 1, allocating objects to a method's invocation stack frame significantly enhances performance of the computer program.

In general, Choi et al. allocate all objects that are marked no escape to an invocation stack frame. However, this general rule has exceptions that are well understood in the art. One such exception relates to array objects. As described above, an array object contains references to other objects. Because the number of references can vary from very small to very large, the corresponding size of array objects may vary over a wide range. If an array object is small, and the size can be determined at compile time, Choi et al. could allocate the array object to the invocation stack frame for the method that created the array object (as shown in FIGS. 6A and 6B). However, if the size is unknown, or if the size is known but exceeds a predetermined threshold value, the array object is allocated from the heap. If an object has a size that is unknown to the compiler, allocating the array on the stack may cause the stack to overflow, which is an unacceptable risk for the compiler. As a result, all prior art mechanisms and methods for performing object allocation allocate objects of unknown size at compile time from the heap.

Examples of Java pseudo-code are presented in FIGS. 7A–7D to illustrate examples of invocation instructions that are "no escape" (FIG. 7A), "global escape" (FIG. 7B), and "arg escape" (FIGS. 7C and 7D). In FIG. 7A, a variable k is defined as a reference to a new object of type Square, but we assume that the lifetime of the allocated object referenced by k does not escape method A. The prior art Choi et al. approach allocates all objects (with some restrictions) for no escape allocations on the method's invocation stack frame. FIG. 7B shows the same variable declaration as in FIG. 7A, but later in method A( ) there is an assignment from k to a class variable classVar. Because classVar is declared as a class variable, its lifetime extends globally beyond method A( ), making this allocation a global escape case. The prior art Choi et al. approach allocates all objects that are global escape from the heap.

FIG. 7C has the same declaration statement for k as FIG. 7A, but includes a statement that returns a reference to the allocated object referenced by k from method A( ). This return value means that the lifetime of the allocated object may potentially extend beyond method A( ), but we don't know to what extent. FIG. 7D shows a different case for arg escape. An instruction L.addToList(k) adds the reference k to a list that was passed in (by reference) as a parameter. The allocated object referenced by k can thus potentially be accessed outside of method A( ), but is not necessarily accessed. These cases illustrate the "arg escape" case, where an argument or return value causes the lifetime of an object to potentially extend beyond the scope of the method that creates the object. The prior art Choi et al. approach treats arg escape cases the same as global escape, forcing these allocations from the heap.

The prior art method disclosed in Choi et al. is represented in simplified form in the method 800 of FIG. 8. First, a class hierarchy graph is constructed (step 810). The class hierarchy graph represents inheritance relationships among all classes in a Java program. There is a node in the class hierarchy graph for each class in the program, and there is an arc in the class hierarchy graph from the node for class A to the node for class B if and only if B directly inherits from (i.e., "extends") class A.

Once a class hierarchy graph is constructed in step 810, a live call graph is constructed (step 820). The live call graph contains one node for every method in a Java program that can apparently be called during that program's execution. Methods that can be called from outside the Java program (such as "main") are designated as "root methods." There is an arc in the live call graph from method A to method B if it appears possible for method A to call method B during program execution. By definition, every method in a live call graph can be reached from at least one root node by a directed sequence of arcs; methods that cannot be executed ("dead methods") are not represented in the live call graph. A method that calls no other method is designated as a "leaf method." Construction of class hierarchy graphs and live call graphs are well known in the art.

Once a live call graph has been built in step 820, an escape analysis can be performed (step 830). An escape analysis means that each allocation instruction (that creates an object) is labeled as one of the three options: no escape, global escape, and arg escape. Once the escape analysis in step 830 is complete, the code is then generated (step 840) using the information in the escape analysis to determine where each object is allocated. In the prior art Choi et al. approach of method 800, objects that are no escape are allocated on the invocation stack frame of the method that creates the object, while objects that are global escape and arg escape are allocated from the heap.

Figure 10:
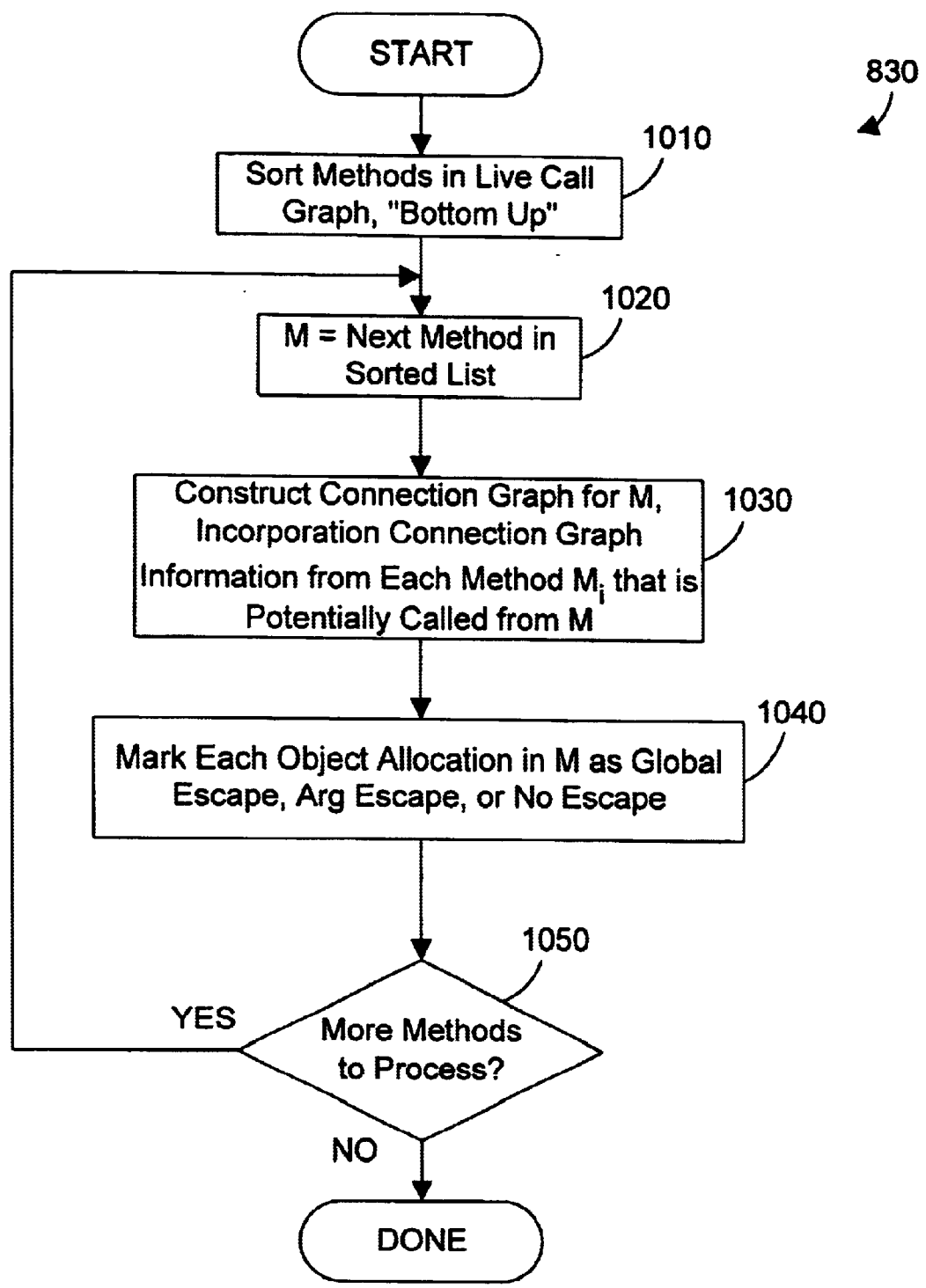
FIG. 10 is a prior art method for performing the escape analysis step 830 of FIG. 8.

Details of the escape analysis step 830 of FIG. 8 are shown in the flow diagram of FIG. 10. First, the methods in the live call graph are sorted from the bottom up (step 1010). This means that leaf nodes in the graph are considered first, which do not call other methods. The first method on the sorted list is then assigned to M (step 1020). A connection graph is the constructed for M, incorporating connection graph information for each method (denoted $M_i$) that is potentially called from M (step 1030). A connection graph denotes potential relationships among variables and parameters that may reference objects, statements that allocate objects, and fields contained in objects. Next, each object allocation in M is marked as global escape, arg escape, or no escape (step 1040). If more methods need to be processed (step 1050=YES), step 830 loops back to step 1020 and continues. Once all methods have been processed (step 1050=NO), step 830 is done. Note that the description of a connection graph herein is simplified for the purpose of illustrating the preferred embodiments of the invention. For more details regarding how to construct a connection graph, see the Choi et al. article referenced above.

Possible Combination of Choi et al. With Knowledge in the Art

Figure 11:
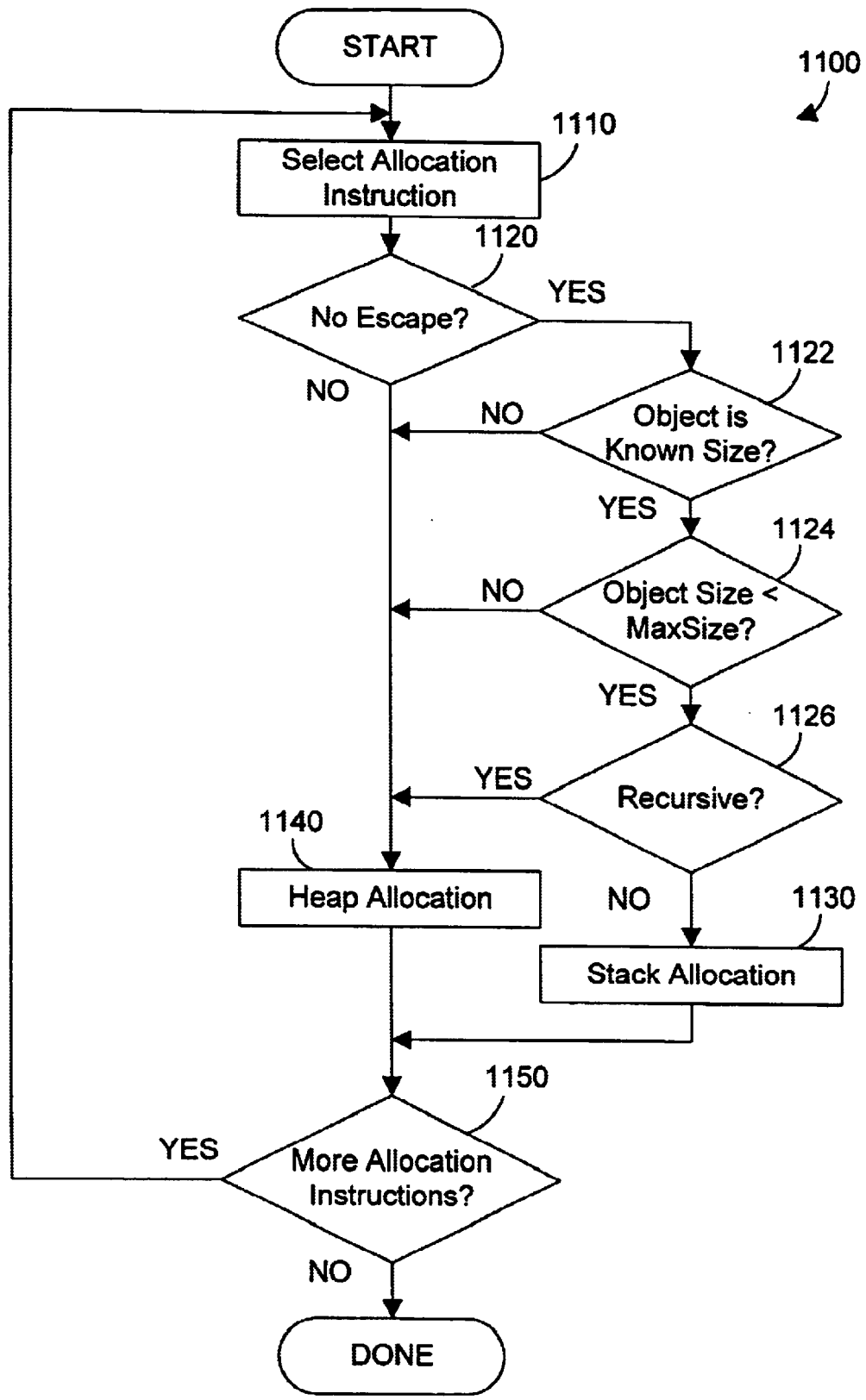
FIG. 11 is a prior art method for allocating Java array objects after performing the prior art escape analysis of FIG. 10.

In the prior art, once an escape analysis has been performed, such as that shown by step 830 in FIGS. 8 and 10, the code can then be optimized using this escape analysis information, as shown in step 840 of FIG. 8. This optimization could be done using the escape analysis information of Choi et al. combined with knowledge in the art regarding the allocation of array objects. Referring now to FIG. 11, a method 1100 for generating optimized code represents a simplified flow diagram of some of the functions that may be included in the generation of the optimized code in step 840. An allocation instruction in the object oriented program is first selected (step 1110). If the allocation instruction is marked as arg escape or global escape (step 1120=NO), the object is allocated from the heap (step 1140). If the instruction is marked as no escape (step 1120=YES), the object is then examined to see if its size is known at compile time (step 1122). If the size of the object is unknown at compile time (step 1122=NO), the object is allocated from the heap (step 1140). If the object is of a known size at compile time (step 1122=YES), but the size is greater than a maximum predetermined threshold value for object size (step 1124=NO), the object is allocated from the heap (step 1140) because the object is too large to be allocated on the stack. If the object is of a known size at compile time (step 1122=YES), and the size is less than the maximum predetermined threshold value for object size (step 1124=YES), method 1100 then checks to see if the method may be called recursively within the program (step 1126). If the method may not be called recursively (step 1126=NO), the object is allocated on the stack (step 1130). If the method may be called recursively (step 1126=YES), the object is allocated from the heap (step 140). If more allocation instructions remain (step 1150=YES), method 1100 loops back to step 1110 and continues. Once no more allocation instructions remain (step 1150=NO), method 1100 is done.

Method 1100 clearly shows that prior art methods for allocating objects allocate all objects of unknown size at compile time from the heap. The preferred embodiments of the present invention described below improve on the prior art by generating run-time code that allocates array objects that are sufficiently small to a stack allocation frame. The details of the preferred embodiments are described below.

2. Detailed Description

An apparatus and method in accordance with the preferred embodiments allow allocating an array object of unknown size at compile time to an invocation stack frame at run-time if certain conditions are met. Run-time code is generated that uses a predetermined threshold value for the size of the array object to allocate objects at run-time that are larger than the predetermined threshold value from the heap, and that allocates objects at run-time that are smaller than the predetermined threshold value to the stack. By allocating small array objects to an invocation stack, the performance of the computer program is enhanced.

Figure 9:
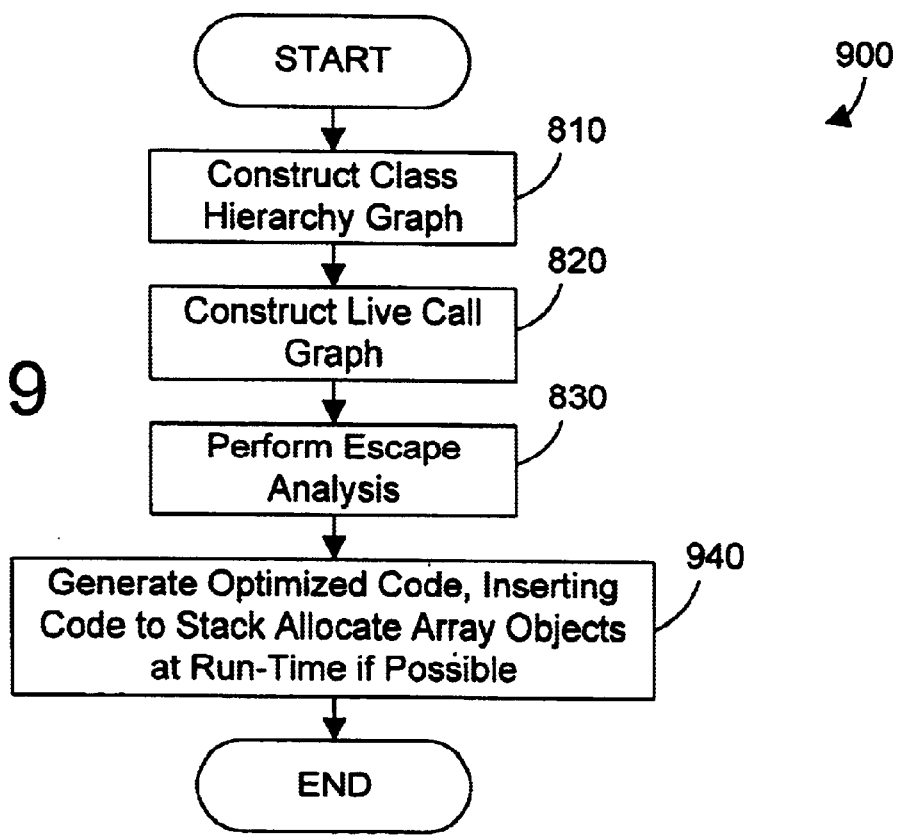
FIG. 9 is a method in accordance with the preferred embodiments for allocating objects in a Java program.

Referring to FIG. 9, a method 900 in accordance with the preferred embodiments allocates array objects to a method's invocation stack frame if certain conditions are met. Steps 810, 820 and 830 are preferably the same steps explained above with reference to FIG. 8. The primary difference is the way that method 900 generates optimized code in step 940.

Method 900 generates run-time code that will make a decision based on the actual size of the array (which is unknown at compile time), and will stack-allocate the array if possible. Suitable criteria for determining whether stack allocation is possible includes determining whether the method that allocates the array may be recursive, and whether the array is sufficiently small by comparing the actual size at run-time to a predetermined threshold value. Of course, other suitable criteria could be used to determine whether stack allocation of an array object is possible.

Figure 12:
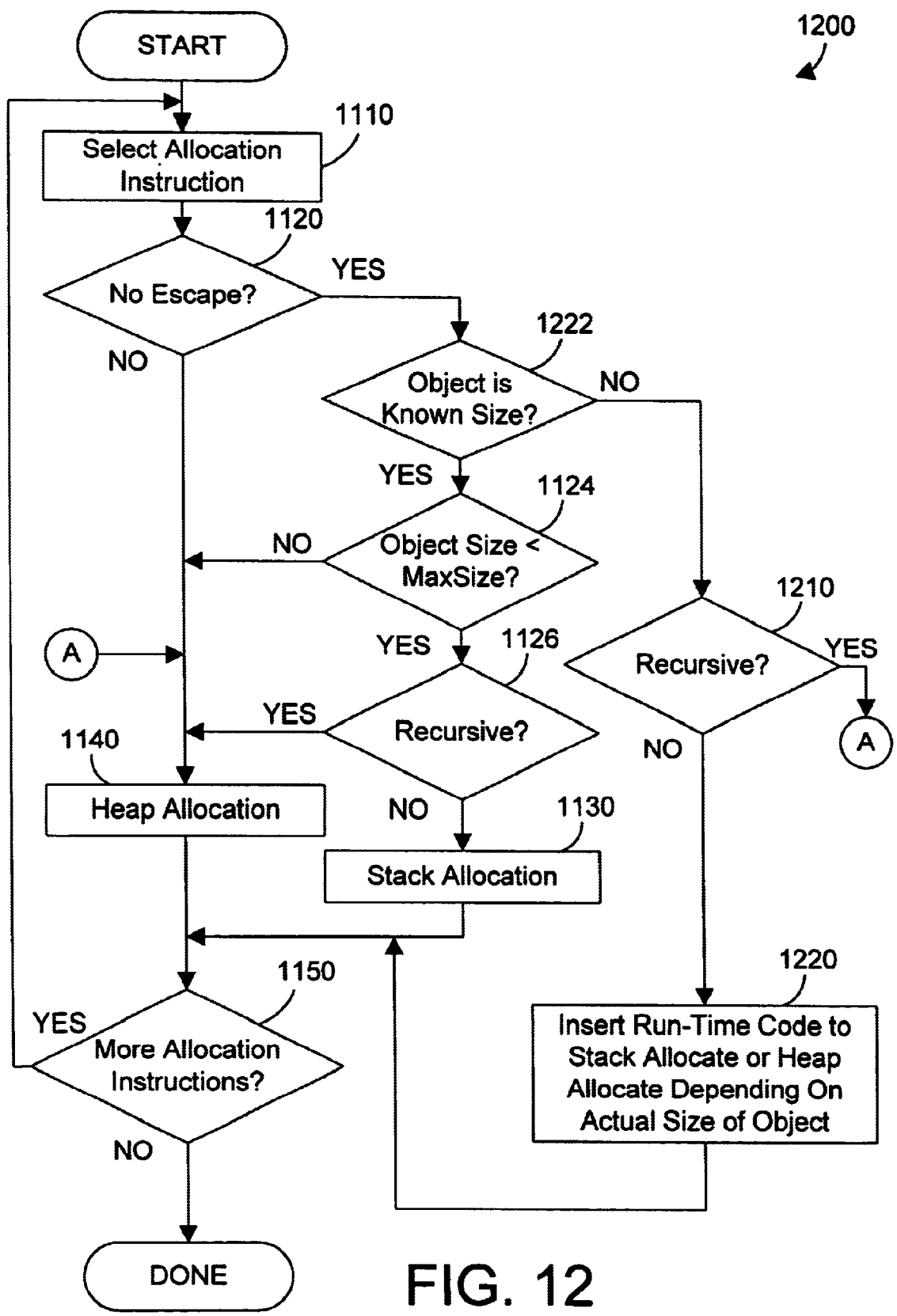
FIG. 12 is a method in accordance with the preferred embodiments for allocating Java array objects.

Referring to FIG. 12, a method 1200 in accordance with the preferred embodiments optimizes a Java program so that small array objects whose size is unknown at compile time may still be stack-allocated in certain circumstances. Note that most of the steps in method 1200 are the same as shown in FIG. 11 and described above. First, an allocation instruction in the object oriented program is selected (step 1110). If the allocation instruction is marked as arg escape or global escape (step 1120=NO), the object is allocated from the heap (step 1140). If the instruction is marked as no escape (step 1120=YES), the object is then examined to see if its size is known at compile time (step 1222). If the object is of a size that is known at compile time (step 1122=YES), but the size is greater than a maximum predetermined threshold value for object size (step 1124=NO), the object is allocated from the heap (step 1140) because the object is too large to be allocated on the stack. If the object is of a known size at compile time (step 1122=YES), and the size is less than the maximum predetermined threshold value for object size (step 1124=YES), method 1100 then checks to see if the method may be called recursively within the program (step 1126). If the method may not be called recursively (step 1126=NO), the object is allocated on the stack (step 1130). If the method may be called recursively (step 1126=YES), the object is allocated from the heap (step 1140).

The preferred embodiments come into play when the size of the object is unknown at compile time (step 1222=NO). In this case, method 1200 checks to see if the method that creates the object may be called recursively (step 1210). If so (step 1210=YES), the object is allocated from the heap (step 1140). If not (step 1210=NO), method 1200 inserts run-time code to stack allocate or heap allocate depending on the actual size of the object at run-time (step 1220). If more allocation instructions remain (step 1150=YES), method 1200 loops back to step 1110 and continues. Once no more allocation instructions remain (step 1150=NO), method 1200 is done.

Figure 13:
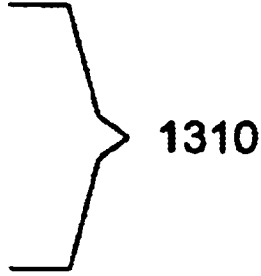
FIG. 13 is a diagram of Java pseudo-code showing the code to determine at run-time whether a Java array object is allocated to an invocation stack or from the heap.

The insertion of run-time code in step 1220 of FIG. 12 is shown in Java pseudo-code in FIG. 13. Instructions 1310 comprise the run-time code that was generated in step 1220 of FIG. 12. This code checks to see if the size of the array object is less than a predetermined threshold value for the array object size, referred to in FIG. 13 as MaxSize. The size of the array object is determined by multiplying the size of the reference times the number of entries in the array. If the size of the array object is less than MaxSize, the array object is stack-allocated. If the size of the array object is greater than or equal to MaxSize, the array object is heap-allocated. Regardless of the allocation, the array object is then initialized to zeroes in statement 1320.

Because the array object may be allocated on the stack, and the size of the object is unknown except that it is bounded by MaxSize (plus the size of the header fields of the array object), the compiler must reserve the maximum amount of space for the array object in the compiled method's stack frame. If the run-time size of the array object is sufficiently small, k is assigned the address of this reserved space (some of which may remain unused). Otherwise, a new object is allocated from the heap, and k is assigned its address.

Note that the description herein refers to two different and distinct predetermined threshold values (referred to herein as MaxSize) for object size. The first is the value that the compiler uses to determine whether an array of known size can be allocated on the stack, as shown in step 1124 of FIGS. 11 and 12. The second is the value that is used at run-time to determine whether to stack-allocate or heap-allocate depending on the size, as shown in the inserted code 1310 of FIG. 13. While these values could be the same, they may also be different within the scope of the preferred embodiments.

Figure 14:
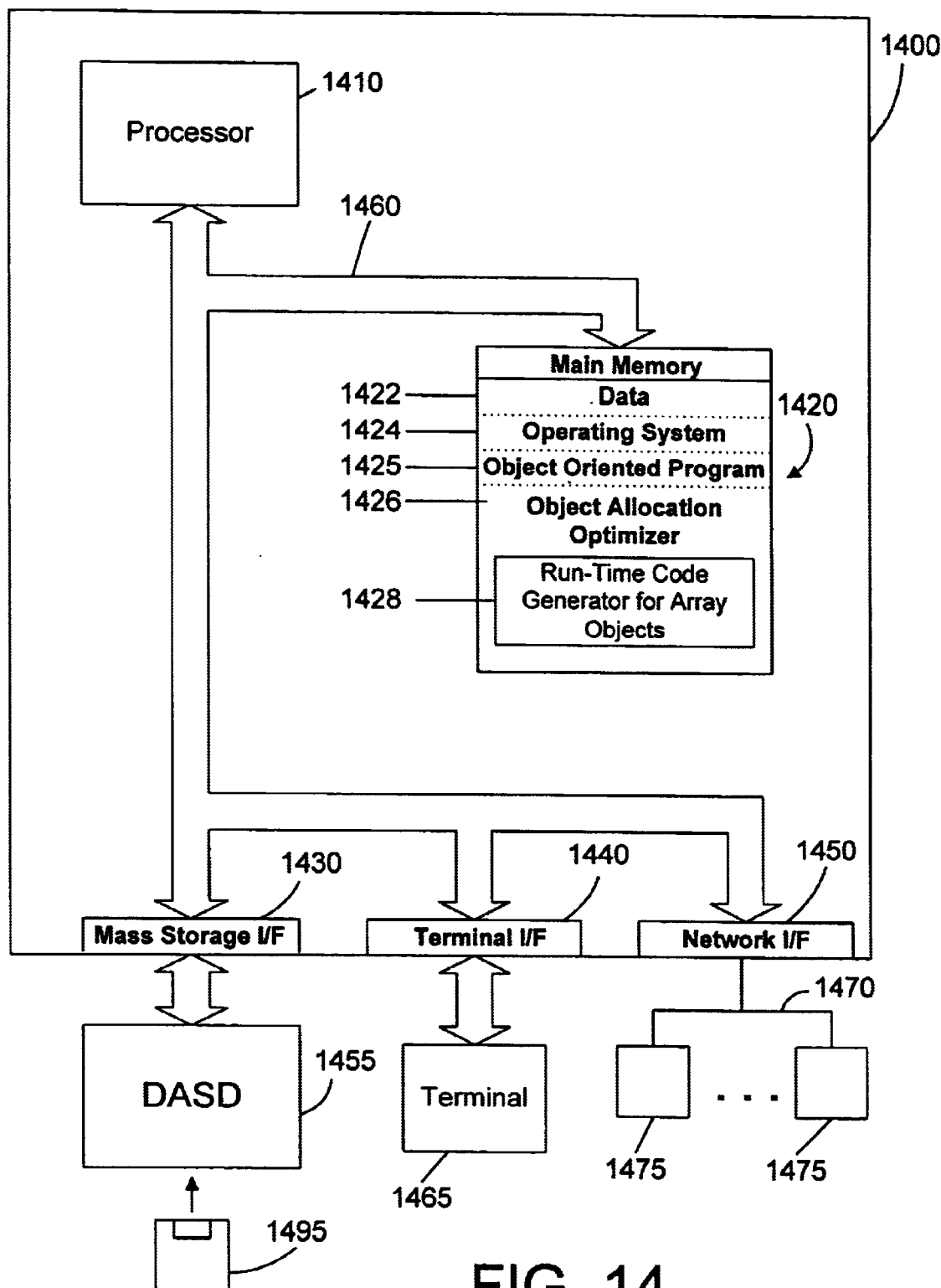
FIG. 14 is a block diagram of an apparatus in accordance with the preferred embodiments.

While the invention thus far has been described as computer-implemented methods, the invention could also be practiced as an apparatus that performs the method steps previously discussed. Referring to FIG. 14, a computer system 1400 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 14, computer system 1400 comprises a processor 1410, a main memory 1420, a mass storage interface 1430, a terminal interface 1440, and a network interface 1450. These system components are interconnected through the use of a system bus 1460. Mass storage interface 1430 is used to connect mass storage devices (such as a direct access storage device 1455) to computer system 1400. One specific type of direct access storage device 1455 is a floppy disk drive, which may store data to and read data from a floppy disk 1495.

Main memory 1420 in accordance with the preferred embodiments contains data 1422, an operating system 1424, an object oriented program 1425, and an object allocation optimizer 1426. In the preferred embodiments, object allocation optimizer 1426 suitably includes a run-time code generator for array objects 1428. Run-time code generator 1428 suitably generates the run-time code, such as 1310 in FIG. 13, that determines at run-time whether to stack-allocate or heap-allocate based on the actual size of the array object at run time.

Computer system 1400 utilizes well known virtual addressing mechanisms that allow the programs of computer system 1400 to behave as if they only have access to a large, single storage entity instead of access to multiple, smaller storage entities such as main memory 1420 and DASD device 1455. Therefore, while data 1422, operating system 1424, OO program 1425, and object allocation optimizer 1426 are shown to reside in main memory 1420, those skilled in the art will recognize that these items are not necessarily all completely contained in main memory 1420 at the same time. It should also be noted that the term "memory" is used herein to generically refer to the entire virtual memory of computer system 1400.

Data 1422 represents any data that serves as input to or output from any program in computer system 1400. Operating system 1424 is a multitasking operating system known in the industry as OS/400; however, those skilled in the art will appreciate that the spirit and scope of the present invention is not limited to any one operating system. Object oriented program 1425 is object oriented or object based, and contains one or more statements that instantiate (or create) object oriented objects.

Processor 1410 may be constructed from one or more microprocessors and/or integrated circuits. Processor 1410 executes program instructions stored in main memory 1420. Main memory 1420 stores programs and data that processor 1410 may access. When computer system 1400 starts up, processor 1410 initially executes the program instructions that make up operating system 1424. Operating system 1424 is a sophisticated program that manages the resources of computer system 1400. Some of these resources are processor 1410, main memory 1420, mass storage interface 1430, terminal interface 1440, network interface 1450, and system bus 1460.

Although computer system 1400 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1410. However, those skilled in the art will appreciate that the present invention applies equally to computer systems that simply use I/O adapters to perform similar functions.

Terminal interface 1440 is used to directly connect one or more terminals 1465 to computer system 1400. These terminals 1465, which may be non-intelligent (i.e., dumb) terminals or fully programmable workstations, are used to allow system administrators and users to communicate with computer system 1400. Note, however, that while terminal interface 1440 is provided to support communication with one or more terminals 1465, computer system 1400 does not necessarily require a terminal 1465, because all needed interaction with users and other processes may occur via network interface 1450.

Network interface 1450 is used to connect other computer systems and/or workstations (e.g., 1475 in FIG. 14) to computer system 1400 across a network 1470. The present invention applies equally no matter how computer system 1400 may be connected to other computer systems and/or workstations, regardless of whether the network connection 1470 is made using present-day analog and/or digital techniques or via some networking mechanism of the future. In addition, many different network protocols can be used to implement a network. These protocols are specialized computer programs that allow computers to communicate across network 1470. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 1495 of FIG. 14) and CD ROM, and transmission type media such as digital and analog communications links.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to the allocation of Java objects, the preferred embodiments are not limited to any particular object oriented language.

What is claimed is:

1. An apparatus comprising:
   at least one processor;
   a memory coupled to the at least one processor;
   an object oriented program residing in the memory comprising at least one array object; and
   a run-time code generator that generates a plurality of instructions that are executed at run-time, wherein the plurality of instructions allocate an array object of unknown size at compile time in the object oriented program to an invocation stack frame if the size of the array object determined at run-time does not exceed a predetermined threshold value.

2. The apparatus of claim 1 wherein the plurality of instructions allocate the array object to a heap if the size of the array object determined at run-time exceeds the predetermined threshold.

3. The apparatus of claim 1 wherein the plurality of instructions allocate the array object from the heap if a method can be recursively called in the object oriented program.

4. The apparatus of claim 1 further comprising an escape analysis mechanism residing in the memory and executed by the at least one processor that marks each instruction in the object oriented program that creates a new object as one of global escape, no escape, and arg escape, wherein the run-time code operator allocates only array objects that are marked no escape to the invocation stack frame.

5. An apparatus comprising:
   at least one processor;
   a memory coupled to the at least one processor;
   an object oriented program residing in the memory comprising at least one array object of unknown size at compile time;
   an escape analysis mechanism that marks each instruction in the object oriented program that creates a new object as one of global escape, no escape, and arg escape;
   a run-time code generator that generates a plurality of instructions that are executed at run-time, wherein the plurality of instructions allocate an array object of unknown size at compile time in the object oriented program to an invocation stack frame for a method that contains an instruction that creates the array object if all of the following are true:
   (A) the instruction that allocates the array object is marked no escape;
   (B) the size of the array object determined at run-time does not exceed a predetermined threshold value; and
   (C) the method that contains the instruction cannot be called recursively in the object oriented program.

6. The apparatus of claim 5 wherein the plurality of instructions allocate the array object to a heap if any of (A), (B) or (C) are not true.

7. A method for allocating objects in an object oriented program to memory, the method comprising the steps of:
   generating a plurality of instructions, wherein the plurality of instructions allocate an array object of unknown size at compile time to an invocation stack frame if the size of the array object determined at run-time does not exceed a predetermined threshold value; and
   executing the plurality of instructions at run-time.

8. The method of claim 7 wherein the plurality of instructions allocate the array object to a heap if the size of the array object determined at run-time exceeds the predetermined threshold.

9. The method of claim 7 wherein the plurality of instructions allocate the array object from a heap if the method can be recursively called in the object oriented program.

10. The method of claim 7 further comprising the step of marking each instruction in the object oriented program that creates a new object as one of global escape, no escape, and arg escape, wherein only array objects that are marked no escape are allocated to the invocation stack frame.

11. A method for allocating objects in an object oriented program to memory, the method comprising the steps of:
    marking each instruction in the object oriented program that creates a new object as one of global escape, no escape, and arg escape; and
    generating a plurality of instructions that are executed at run-time, wherein the plurality of instructions allocate an array object of unknown size at compile time in the object oriented program to an invocation stack frame for a method that contains an instruction that creates the array object if all of the following are true:
    (A) the instruction that allocates the array object is marked no escape;
    (B) the size of the array object determined at run-time does not exceed a predetermined threshold value; and
    (C) the method that contains the instruction cannot be called recursively in the object oriented program.

12. The method of claim 11 wherein the plurality of instructions allocate the array object to a heap if any of (A), (B) or (C) are not true.

13. A program product comprising:
    a run-time code generator that generates a plurality of instructions that are executed at run-time, wherein the plurality of instructions allocate an array object of unknown size at compile time to an invocation stack frame if the size of the array object determined at run-time does not exceed a predetermined threshold value; and
    signal bearing media bearing the run-time code generator.

14. The program product of claim 13 wherein said signal bearing media comprises recordable media.

15. The program product of claim 13 wherein said signal bearing media comprises transmission media.

16. The program product of claim 13 wherein the plurality of instructions allocate the array object to a heap if the size of the array object determined at run-time exceeds the predetermined threshold.

17. The program product of claim 13 wherein the plurality of instructions allocate the array object from a heap if a method can be recursively called in the plurality of instructions.

18. The program product of claim 13 further comprising an escape analysis mechanism residing on the signal bearing media that marks each instruction that creates a new object in an object oriented program that includes the array object as one of global escape, no escape, and arg escape, wherein the run-time code generator allocates only array objects that are marked no escape to the invocation stack frame.

19. A program product comprising:
(1) an object allocation optimizer comprising:
   an escape analysis mechanism that marks each instruction in an object oriented program that creates a new object as one of global escape, no escape, and arg escape; and
   a run-time code generator that generates a plurality of instructions that are executed at run-time, wherein the plurality of instructions allocate an array object of unknown size at compile time in the object oriented program to an invocation stack frame for a method that contains an instruction that creates the array object if all of the following are true:
   (A) the instruction that allocates the array object is marked no escape;
   (B) the size of the array object determined at run-time does not exceed a predetermined threshold value; and
   (C) the method that contains the instruction cannot be called recursively in the object oriented program; and
(2) signal bearing media bearing the object allocation optimizer.

20. The program product of claim 19 wherein said signal bearing media comprises recordable media.

21. The program product of claim 19 wherein said signal bearing media comprises transmission media.

* * * * *

UNITED STATES PATENT AND TRADEMARK OFFICE
CERTIFICATE OF CORRECTION

PATENT NO. : 6,675,378 B1  Page 1 of 1
DATED : January 6, 2004
INVENTOR(S) : William Jon Schmidt It is certified that error appears in the above-identified patent and that said Letters Patent is hereby corrected as shown below:

<u>Column 13</u>,
Line 6, "operator" should be -- generator --.

Signed and Sealed this

Twenty-fifth Day of May, 2004

JON W. DUDAS
*Acting Director of the United States Patent and Trademark Office*